(12) United States Patent
Lu

(10) Patent No.: US 10,103,890 B2
(45) Date of Patent: Oct. 16, 2018

(54) MEMBERSHIP QUERY METHOD

(71) Applicant: Haw-minn Lu, San Diego, CA (US)

(72) Inventor: Haw-minn Lu, San Diego, CA (US)

( * ) Notice: Subject to any disclaimer, the term of this patent is extended or adjusted under 35 U.S.C. 154(b) by 127 days.

(21) Appl. No.: 14/822,843

(22) Filed: Aug. 10, 2015

(65) Prior Publication Data
US 2016/0197730 A1 Jul. 7, 2016

Related U.S. Application Data

(60) Provisional application No. 62/035,259, filed on Aug. 8, 2014.

(51) Int. Cl.
*H04L 9/32* (2006.01)
*H04L 29/06* (2006.01)

(52) U.S. Cl.
CPC ........ *H04L 9/3247* (2013.01); *H04L 63/0861* (2013.01); *H04L 63/123* (2013.01)

(58) Field of Classification Search
CPC . H04L 9/3247; H04L 63/0823; H04L 63/123; H04L 63/126; H04L 9/3242; H04L 2209/24; H04L 2209/72; H04L 63/00; G06F 21/64

See application file for complete search history.

(56) References Cited

U.S. PATENT DOCUMENTS

| | | | | |
|---|---|---|---|---|
| 2004/0133796 A1* | 7/2004 | Cohen | ................... | G06F 21/566 726/24 |
| 2004/0168077 A1* | 8/2004 | Waxman | ............. | G06F 21/6227 726/28 |
| 2005/0283838 A1* | 12/2005 | Saito | ..................... | G06F 21/563 726/24 |
| 2006/0026685 A1* | 2/2006 | Saito | ........................ | G06F 21/52 726/23 |
| 2006/0041863 A1* | 2/2006 | Saito | ..................... | G06F 21/566 717/124 |
| 2009/0049551 A1* | 2/2009 | Ahn | ....................... | G06F 21/562 726/23 |
| 2009/0210705 A1* | 8/2009 | Chen | ..................... | H04L 9/0891 713/158 |
| 2010/0050256 A1* | 2/2010 | Knapp | ................ | H04L 63/1425 726/22 |
| 2010/0192222 A1* | 7/2010 | Stokes | .................. | G06F 21/563 726/22 |
| 2010/0284282 A1* | 11/2010 | Golic | .................... | H04L 43/022 370/242 |

(Continued)

*Primary Examiner* — Yonas A Bayou
(74) *Attorney, Agent, or Firm* — San Diego IP Law Group LLP; Trevor Coddington

(57) ABSTRACT

Disclosed is a method of evaluating membership in a membership set. The membership query system receives data to determine membership. A representative pattern is extracted from the data that may be of a predetermined length or of an arbitrary length. A learning mode of the membership query system defines the membership set as a membership signature. The membership query system then determines whether the representative pattern is a member of the membership signature by applying a membership function. In the context of cybersecurity, if the data is a member of a set of known good executable files, then the executable file may be allowed or installed. If the data is not a member of a set of known good executable files, then the file is flagged for further investigation.

18 Claims, 7 Drawing Sheets

(56) References Cited

U.S. PATENT DOCUMENTS

| | | | |
|---|---|---|---|
| 2012/0174181 A1* | 7/2012 | Zhang | G06F 21/10 726/1 |
| 2012/0260342 A1* | 10/2012 | Dube | G06F 21/564 726/24 |
| 2013/0321458 A1* | 12/2013 | Miserendino | H04L 41/0883 345/629 |

* cited by examiner

MEMBERSHIP QUERY METHOD

CROSS-REFERENCE TO RELATED APPLICATION

The present application claims priority to U.S. Provisional Patent Application No. 62/035,259, filed on Aug. 8, 2014, entitled "Systems and Methods for Detecting Malicious Cyber Activity Using Novelty Filtration" the entire disclosure of which is incorporated by reference herein.

STATEMENT REGARDING FEDERALLY SPONSORED RESEARCH

The work leading to the invention that is the subject of the present application was funded in part by Grant No: N66001-14-P-5105 awarded by the Department of Defense. Accordingly, the United States government has certain rights in the invention.

BACKGROUND OF THE INVENTION

1. Field of Invention

This invention relates generally to cybersecurity and, more specifically, to the application of membership queries to software behavior to identify, among other things, unknown cybersecurity risks.

2. Description of Related Art

The global nature of today's computing world has evolved to a point where almost any transaction, whether economic, social, governmental, etc., requires involvement of computer systems and the Internet. The execution of these transactions aptly depends upon the proper functioning of both computer systems and the Internet. In order to shield these transactions from malicious threats, it is critical to identify and deploy efficient and rapidly-performing peripheral tools capable of enhancing cyber situational awareness.

Today's cybersecurity technologies seek to detect known bad entities, e.g., malware, in the computing environment. As used herein, malware refers to any form of hostile or intrusive software including, but not limited to viruses, worms, trojan horses, ransomware, spyware, adware, scareware, and other malicious programs. Malware can take the form of executable code, scripts, active content, and other software. Adversaries are generating malware and finding new vulnerabilities faster than security software companies can respond. The approach today is very much based on prevention by securing systems using best practices and utilization of tools for the detection of known threats (referred to herein as "known bads"). Threats must first be realized in some capacity before today's cybersecurity detection tools can be deployed to search for known bad entities. These detection methods, however, are limited to searching only for known bad signatures. Conventional methods generally use a blacklist, i.e., a register of known malware or sources of malware (e.g., malicious websites). Google, for example, finds thousands of new malicious websites every day. Millions of pieces of malware are identified every month. Thus, blacklisting requires a significant amount of computer resources to store and process the enormous volume of known bads. Moreover, blacklisting cannot detect things that are bad, but not known. Zero-day threats are not known and blacklisting lets them in as if they were good.

A whitelist is a register of known goods, e.g., executables known to be acceptable. In whitelisting, all that's on the whitelist is allowed while everything else is prevented. However, maintaining a whitelist is difficult from an administrative perspective. For example, the problem arises when one wants to register or re-register every dynamic link library (DLL) every time a new or existing application patch is installed. Which bits of software can make changes and which can't? Whitelisting may be fundamentally better than blacklisting because if something is not on the list, it gets stopped. However, whitelisting suffers from the same issue as blacklisting—eventually, a significant amount of computer resources are required to store and process the enormous volume of known goods.

Therefore, there exists a need for an efficient and rapidly-performing peripheral tool capable of enhancing cyber situational awareness by identifying known good entities and allowing these objects to proceed, identifying known bad entities and blocking those objects, while simultaneously identifying novel entities worthy of further analysis and characterization without requiring significant computer resources.

SUMMARY OF THE INVENTION

The present invention overcomes these and other deficiencies of the prior art by providing a method of evaluating membership. When evaluating membership in the context of executable files, an executable file is received and a representative pattern of a predetermined length or of an arbitrary length is extracted from the executable file. A membership signature is acquired through a learning mode of the present invention and a determination is made whether the representative pattern is a member of the membership signature by applying a membership function.

The method of the present invention includes a learning mode and a testing mode. The learning mode defines the membership signature and includes the steps of setting a membership signature to a predetermined initial value; receiving an executable file; extracting a representative pattern of a predetermined length or of an arbitrary length from the executable file; and defining the membership signature by adding the representative pattern of a predetermined length to the predetermined initial value of the membership signature. The learning mode may also include a step to determine whether the extracted representative pattern of a predetermined length is already a member of the membership signature.

The testing mode of the present invention determines whether the representative pattern is a member of the membership signature and includes the step of comparing a dot product of the representative pattern and the membership signature to a predetermined value. If the dot product of the representative pattern and the membership signature is greater than the predetermined value, then the representative pattern is a member of the membership set. If the dot product is less than the predetermined value, then the representative pattern is not a member of the membership set. The testing mode may also include a step to update the membership signature by determining whether the representative pattern that is not a member of the membership set qualifies for inclusion in the membership set and updating the membership set to include the representative pattern that is not a member of the membership set if it is determined the representative pattern that is not a member of the membership set qualifies for inclusion.

The method of the present invention is also applicable to evaluating membership in a database of biometric data and includes the steps of: receiving biometric data from a user; extracting a representative feature from the biometric data;

determining whether the extracted feature is a member of the database of biometric data; and authenticating the user if it is determined the extracted representative feature is a member of the database of biometric data.

The methods of the present invention comprise instructions includable on at least one non-transitory computer readable medium including computer-executable instructions readable by a processor for configuring the processor to: receive an executable file; extract a representative pattern of a predetermined length from the executable file; acquire a membership signature; and determine whether the representative pattern is a member of the membership signature by applying a membership function.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
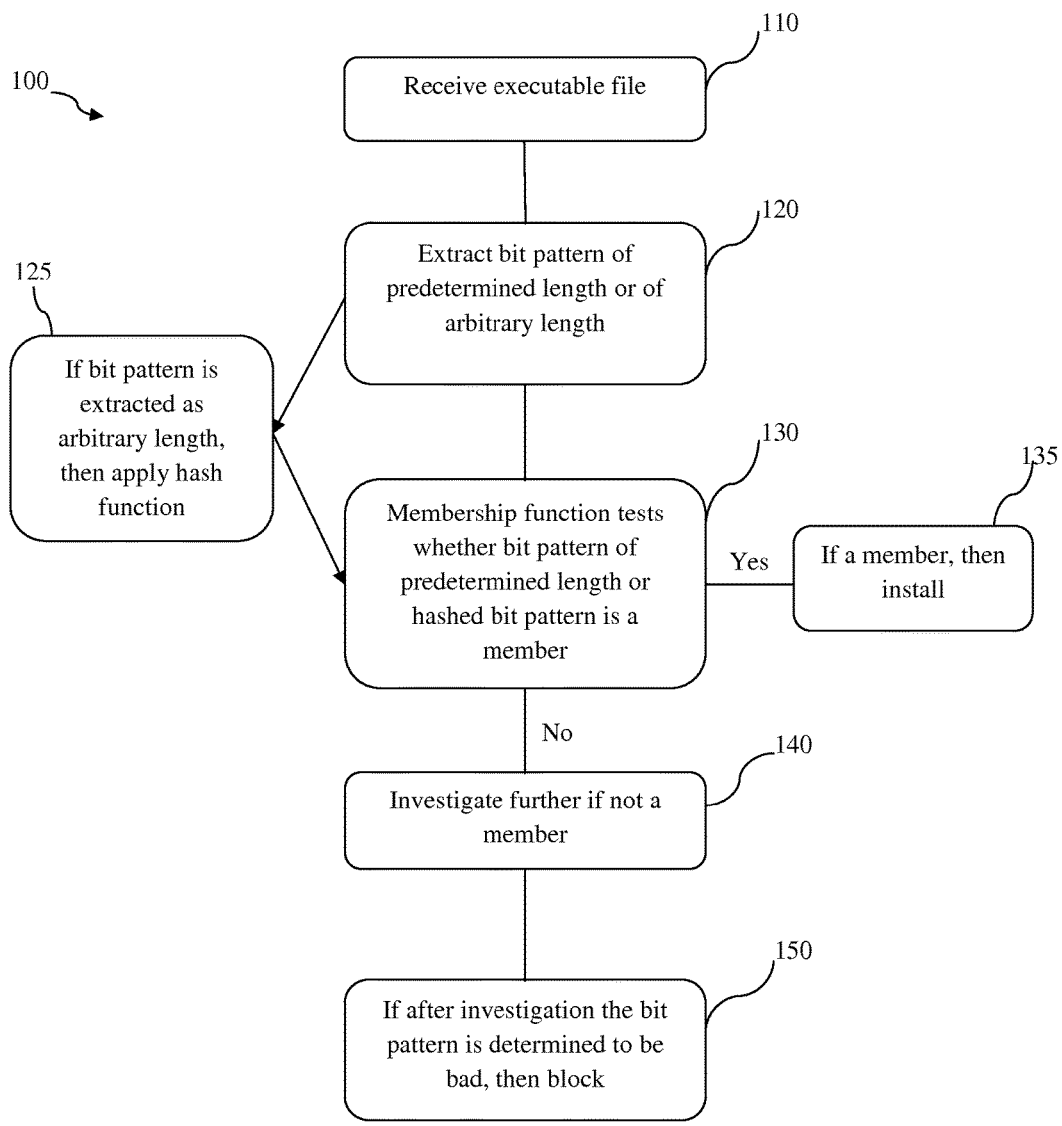
FIG. 1 is a flowchart of a membership query system according to one embodiment of the present invention.

Preferred embodiments of the present invention and their advantages may be understood by referring to FIGS. 1-7, wherein like reference numerals refer to like elements. Although the invention is described in the context of malware, one of ordinary skill in the art readily appreciates that the techniques described herein are applicable to any activity where identification of a piece of data being a member of a larger database of data (i.e., the membership set) is useful including, but not limited to, image data (e.g., satellite images or facial recognition), biometric data, or any type of data pertaining to financial markets, healthcare, social services, insurance activities, and many other business sectors.

While the methodology described herein is extensible to images, behaviors, other data types, and the like that might be of interest in a situational awareness scenario, for the sake of clarity, the use case described herein is to analyze executable files or malware. As such the data type being investigated is a binary string of arbitrary length. In the simplest case, a membership query system would simply store signatures of all the binary strings it has seen. When a new string is examined, the membership query system simply indicates whether the string is "known good" or "known bad" or even more general whether the string is a member of a set. In this context, a "known good" or "known bad" refers to executable files that are known to be legitimate executable files ("known good") or malware, computer viruses, etc. ("known bad"). If the string is a "known good" it passes, if it is not it is marked for further investigation.

Essential to building a tractable cybersecurity system is the use of an efficient set of membership signatures. The brute force method of keeping track of whether something is "known bad," "known good," or more generally, a member of a set, is to keep a list of all the members (or their respective signatures). However, much more information is retained beyond membership, such as actual set contents, ordering, and the like. This extra information costs memory and computation power. Therefore, a membership query system can be used to drastically reduce memory consumption and speed up testing for membership. In essence, the system is not remembering everything, every pattern, or every executable ever seen previously, but instead it is remembering a composite membership signature of the entire member set that is used to identify membership. The present invention, therefore, provides a much more concise and efficient reference or exemplar to the past patterns or executables seen.

The present invention as described with respect to the use case herein includes a membership function that has three major configuration parameters corresponding to three algebraic functions: addition, multiplication, and a distance function. It is to be understood that the mathematics operations with respect to these three algebraic functions may be given the meaning known to one of ordinary skill in the art but may also have the unconventional meaning as described herein below.

The membership function of the membership query system may be linearly scalable and parallelizable. In some embodiments, the membership function can be executed in parallel on parallel hardware. As such, the parallel membership functions can be employed concurrently to the membership sets.

In another embodiment, signatures (or other activity) can be categories (maybe more than simply good or bad). Each category can be maintained by a separate membership query system. In the executable file scenario, there is a membership query system for "known good" and a membership query system for "known bad." Based on analysis there could be a set of rules that govern the movement from one category to another. For example, a previously unknown signature could be placed in quarantine and managed as a quarantined signature. It may have been inspected by a code inspection tool, but maybe protocol requires a signature be cleared by three tools or a complex clearance flow. There would be a sequence of rules that would govern its final disposition, so a rule might be "if a signature is unknown, then it needs to be code inspected". If a signature is code inspected and has passed execution in a cyber range, then place it in the good bin. In this fashion, which set a signature ends up in is a product of inferences made by these rules.

FIG. 1 is a flowchart of a membership query system 100 according to one embodiment of the present invention. In this diagram, the membership query system 100 is configured to receive an executable file at 110. At step 120, the membership query system 100 extracts bit patterns of a predetermined length. The bit pattern may be, for example, 1,000 bits or 1,000,000 bits. In the embodiment described herein with respect to this use case, the extracted bit pattern has a predetermined length that is equal to or greater than 10,000 bits.

In an alternative embodiment, membership query system 100 could be implemented in a post-processing capacity following the use of standard cyber tools detecting 'known bads' or registered threats. For example products such as McAfee, Symantec, and Kaspersky would detect registered malware, and once the data was deemed to be free of registered threats, a membership query system would evaluate the data. A feedback loop could be established between the membership query system evaluation and the product vendors to strengthen the existing malware detection products by incorporating threats newly registered using the membership query system. In this embodiment, the membership query system 100 integrated with a malware detection system may generate a virus signature, or bit pattern, that meets the predetermined length requirements at step 120. As such, the process would continue as described in FIG. 1 at step 130.

In some embodiments, at step 120, the membership query system 100 extracts bit patterns of an arbitrary length. At step 125, a hash function is performed. A hash function is any function that can be used to map digital data of arbitrary size to digital data of fixed size. The hash function may be a cryptographic hash function or a non-cryptographic hash function. A cryptographic hash function may be used to produce bit patterns of uniform length, it may be used to randomly scatter the bit patterns where the bit patterns have close Hamming distances, and/or it may be a one-way hash function that is impossible to invert, or in other words, impossible to recreate the input data from the hashed data alone.

The values returned by a hash function are called hash values, hash codes, hash sums, or simply hashes. Examples of cryptographic hash functions include, but are not limited to, MD5, SHA-1, SHA-256, and SHA-512, the implementation of which is apparent to one of ordinary skill in the art. These examples of cryptographic hash functions, however, are limited by applicable bit sizes such as 128, 160, 256, and 512 bits. To construct a much longer bit string needed for the use case described herein, as for example 10,000 bits, the hash function may be cascaded. For example only, suppose a hash code of 1024 bits is desired. To achieve a bit size of 1024, a SHA-512 hash function may be applied and then append a SHA-512 hash of the pattern in reverse. From this simple example one of ordinary skill in the art will appreciate the countless ways to apply a hash function and generate a much longer bit pattern.

By way of a non-limiting example, in an alternative embodiment, a bit pattern of predetermined length may be extracted by a standard cyber tool for detecting registered threats as is known to one of ordinary skill in the art. For example, the cyber tool may extract a bit pattern of 512 bits. A hash function as described above may be applied to achieve a much longer bit pattern such as 10,000 bits.

At step 130, the membership query system 100 includes a membership function that tests or queries whether the extracted bit pattern of predetermined length at step 120 or the hashed executable file at step 125 is a member of a database of a certain data type, i.e., "known good" executable files, for example. In an embodiment of the invention, a "known good" executable file includes any executable that is not malware, computer viruses, etc.

If the bit pattern at step 130 is a member of the database of "known good" executable files, then the membership query system 100 may send an instruction to install 135 or accept the "known good" executable file.

If the test at step 130 determines that the bit pattern is not a member of the database of "known good" executable files, then the membership query system 100 flags the file at step 140 for further investigation, quarantine, etc. If after further investigation, a determination is made that the flagged executable file is a "bad," then at step 150, the membership query system 100 may send an instruction to block the installation of the now "known bad" executable file.

In the context of executable files, the term signature represents a membership set or a database of a particular data type and is used interchangeably throughout the description of the several embodiments herein. It is to be understood that the term signature, membership signature, and membership set are interchangeable and for the purposes of the description herein have the same meaning. Likewise, it will be understood by one of ordinary skill in the art that the membership set according to the present invention only contains concise and efficient references or exemplars to past patterns or executables seen by the membership query system.

The membership query system comprises a signature, a membership function, and an addition function. The signature, in the context of executable files, is represented by a binary string of a predetermined length and is representative of the members in a set. The binary string length may be any length but for the purposes of the use case described herein, the binary string length is equal to or greater than 10,000 bits.

The membership function looks at a new executable file of a predetermined length, which is input into the membership query system, and determines, in conjunction with the signature, whether that new executable file is in the membership set. The addition function, in essence, updates the signature to reflect the addition of a new executable file to the membership set. For example, if the membership set or signature contains "known good" executable files, then when the membership query system identifies a new "good," the addition function updates the signature to include the new now "known good" to the membership set. As such, the membership query system includes an evolving set membership function.

The membership function may exploit the fact that two randomly selected vectors in a large dimensional vector space are most likely to be nearly orthogonal. The membership function has three major configuration parameters corresponding to three algebraic functions: addition, multiplication, and a distance function. The membership function has two modes of operation—a "learn" mode and a "test" mode. In the learn mode, the membership query system is defining the membership set or signature by adding any inputs, or in this case executable files, to the membership set of known values. In the context of executable files, or malware, the known values may represent "known goods," "known bads," or both "known goods" and "known bads." In the test mode, the membership query system determines whether any inputs, or in this case executable files, belong to the set of known values created in the learn mode.

In one embodiment of the learn mode, the membership query system may include a step to determine whether any input, or executable file, is already a member of the membership set. If the executable file is not already a member of the membership set, then the membership query system would proceed by defining the membership set or signature. If the executable file is already a member of the membership set, then the action is complete.

In the test mode, the multiplication and distance function is used to define a dot product. The dot product is calculated between the input and the signature. If the dot product is less than a predetermined value, then the input is not a member of the membership set. If the dot product is greater than the predetermined value, then the input is a member of the membership set.

The membership function relies on the principle that in high dimensional spaces, random vectors are almost always nearly orthogonal. In other words, the dot product between the random vectors that are nearly orthogonal, or between the input and the signature, is nearly zero.

While this approach works if the vectors, or bit strings, are random, similar vectors or bit strings that differ in one component only will have a dot product that is significantly non-zero. To avoid having a significantly non-zero dot product, a hash function can be used to randomize or scatter the vectors or bit strings thereby giving random vectors or bit strings that are almost always nearly orthogonal. After application of the hash function, the dot product between the random vectors or bit strings that are nearly orthogonal is now nearly zero. Furthermore, as described above, this hash function may be used to map digital data of arbitrary size to digital data of fixed size. Since at least one hash function is necessary, a cryptographic hash function may be used. The constraint, however, is that the hash function takes an arbitrary size string and produces a digest the same length as the signature.

An alternative approach to the above approach is to have the signature represent the vector space approximately spanned by the member vectors of the signature. In this embodiment, a good way to represent the vector space approximately spanned by the member vectors is by a using a collection of unit vectors and coefficients, which would involve storing two numbers in a sparse representation.

By way of non-limiting example, suppose x, y and z are orthogonal member vectors in the signature S. The signature is then represented as S=x+y+z (for the sake of simplicity assuming unit vectors). It follows that if the vector w is orthogonal to x, y or z, then the dot product of S and w is zero. If, however, the vector w is one of the vectors x, y or z, then the dot product of S and w is non-zero. To address this non-zero dot product we can take this approach one step further by way of a non-limiting example assuming a signature of 10,000 member dimensional vectors. In this non-limiting example using a 10,000 member dimensional vector signature, if the signature is stored as the sum of member vectors (e.g., S=x+y+z), then a random vector not related to the vectors in the signature would have a normalized dot product $S \cdot v = x \cdot v + y \cdot v + z \cdot v$ which is less than 0.003. Here, a normalized dot product is simply the dot product divided by the number of dimensions. As can be seen by the approach in this embodiment, the dot product can be used to give a number that is nearly zero.

While mathematically, in principle, this encoding of a signature in this fashion is sound. The efficiency of the representation is highly dependent on the arithmetic imposed upon the vectors. Normal real number arithmetic is the most accurate but least efficient. As is known in the art, floating point is often 16 bits per number and "double precision" is 32 bits. There is even quad precision etc.

Figure 2:
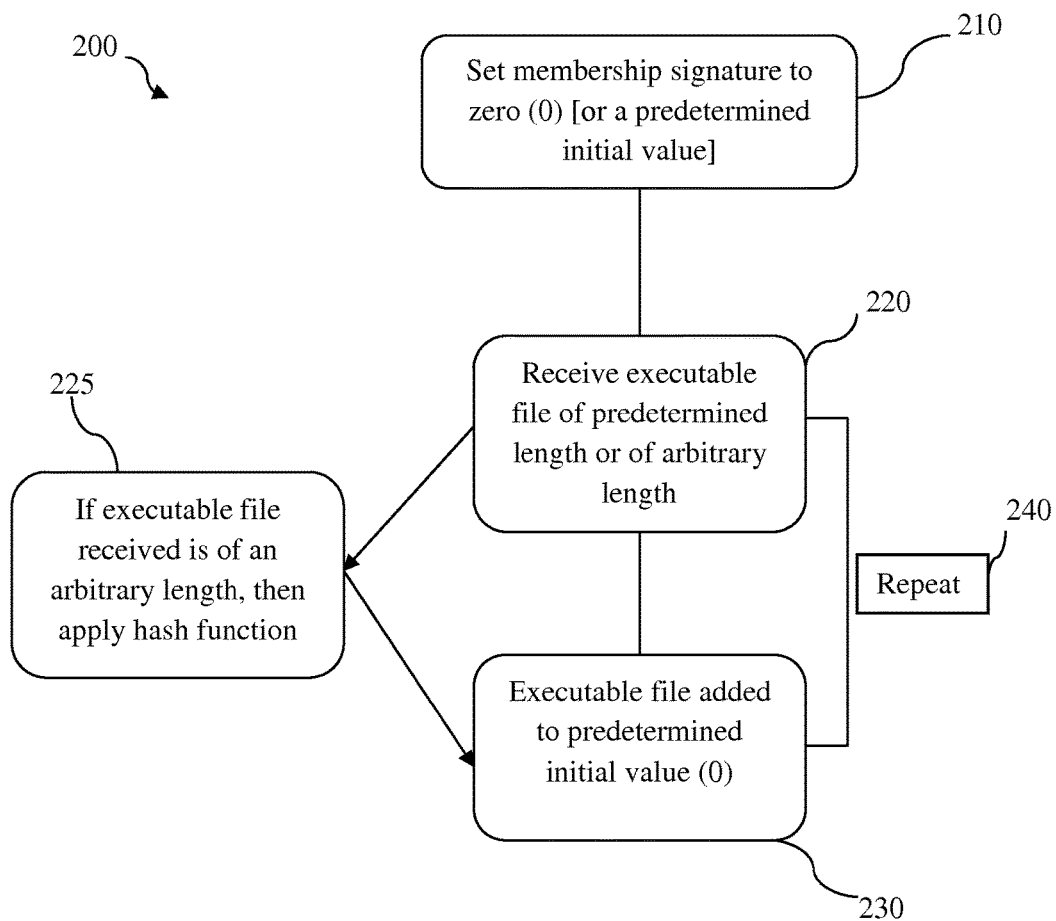
FIG. 2 is a flowchart of a method of learning according to one embodiment of the present invention.

Referring now to FIG. 2, a flow chart of the method of learning 200 according to one embodiment of the present invention is depicted. Initially, at 210, the membership signature is set to an arbitrary number or predetermined initial value. The predetermined initial value may be an arbitrary value of the same length as the predetermined length used throughout the membership query system. In the use case described herein, the membership signature is set equal to zero (0). The predetermined initial value, however, can be any value. At 220, an input, or executable file of predetermined length, is received. As described above with respect to FIG. 1, the executable file received may already be at a predetermined length and does not require the application of a hash function. As such, the process would continue at step 230 without the need to apply a hash function. In an alternative embodiment, at 225, the executable file is of an arbitrary length and is hashed to a bit pattern of a predetermined, fixed length. The received or hashed executable file is then added at 230 to the membership set by adding the received or hashed executable file to the membership signature, which is set to zero (0) in this embodiment. This process is repeated at 240, until the membership signature is defined.

Figure 3:
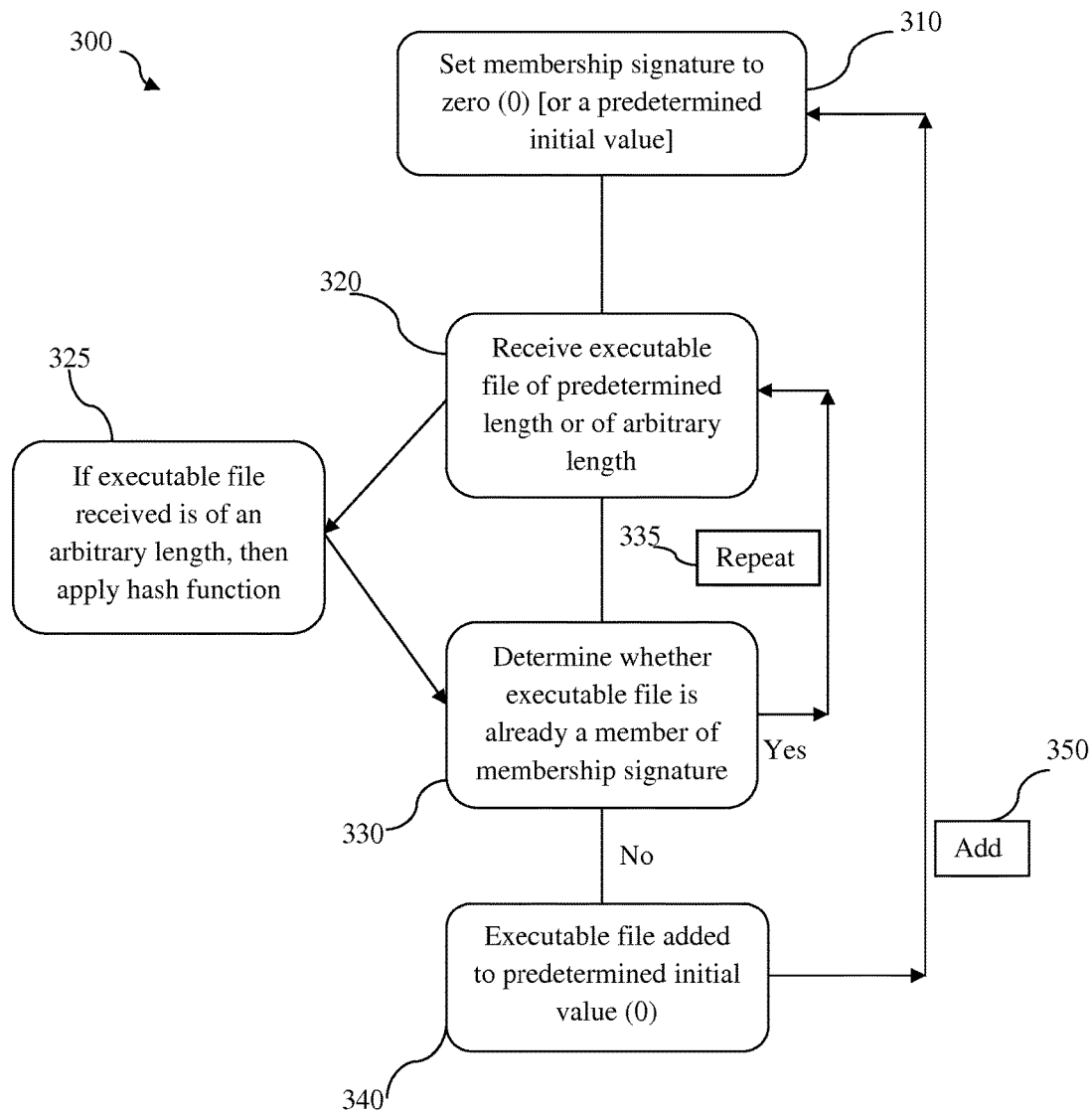
FIG. 3 is a flowchart of a method of learning according to an alternative embodiment of the present invention.

FIG. 3 is representative of another embodiment of the present invention where the method of learning 300, includes the additional step 330, to test and determine whether any input executable file, received at 320, is already a member of the membership set. At 320, an executable file of predetermined length, is received. As described above with respect to FIG. 1, the executable file received may already be at a predetermined length and does not require the application of a hash function. As such, the process would continue at step 330 without the need to apply a hash function. In an alternative embodiment, at 325, the executable file is of an arbitrary length and is hashed to a bit pattern of a predetermined, fixed length. The method of learning 300 proceeds at 340 to add at 350 the executable file to the membership signature at 310 if it is determined at 330 the executable file is not already a member of the signature. This process is repeated until the membership signature is defined. If at the determining step of 330, it is determined the executable file is already a member of the signature, then the method of learning 300, with respect to this input at 320 is complete and the method repeats at 335 to step 320, to repeat the method until the membership signature is defined.

Once the membership query system is trained through the method of learning as depicted in FIGS. 2 & 3, the membership query system includes an operational mode whereby a method of testing is implemented to determine whether any executable files belong to the set of known values created in the method of learning. Although the membership function aspect of the membership query system is described as two separate methods, i.e. a learning mode and a testing mode, it will be understood by one of ordinary skill in the art that the membership function may be performing the method of learning and the method of testing in parallel or concurrently.

Figure 4:
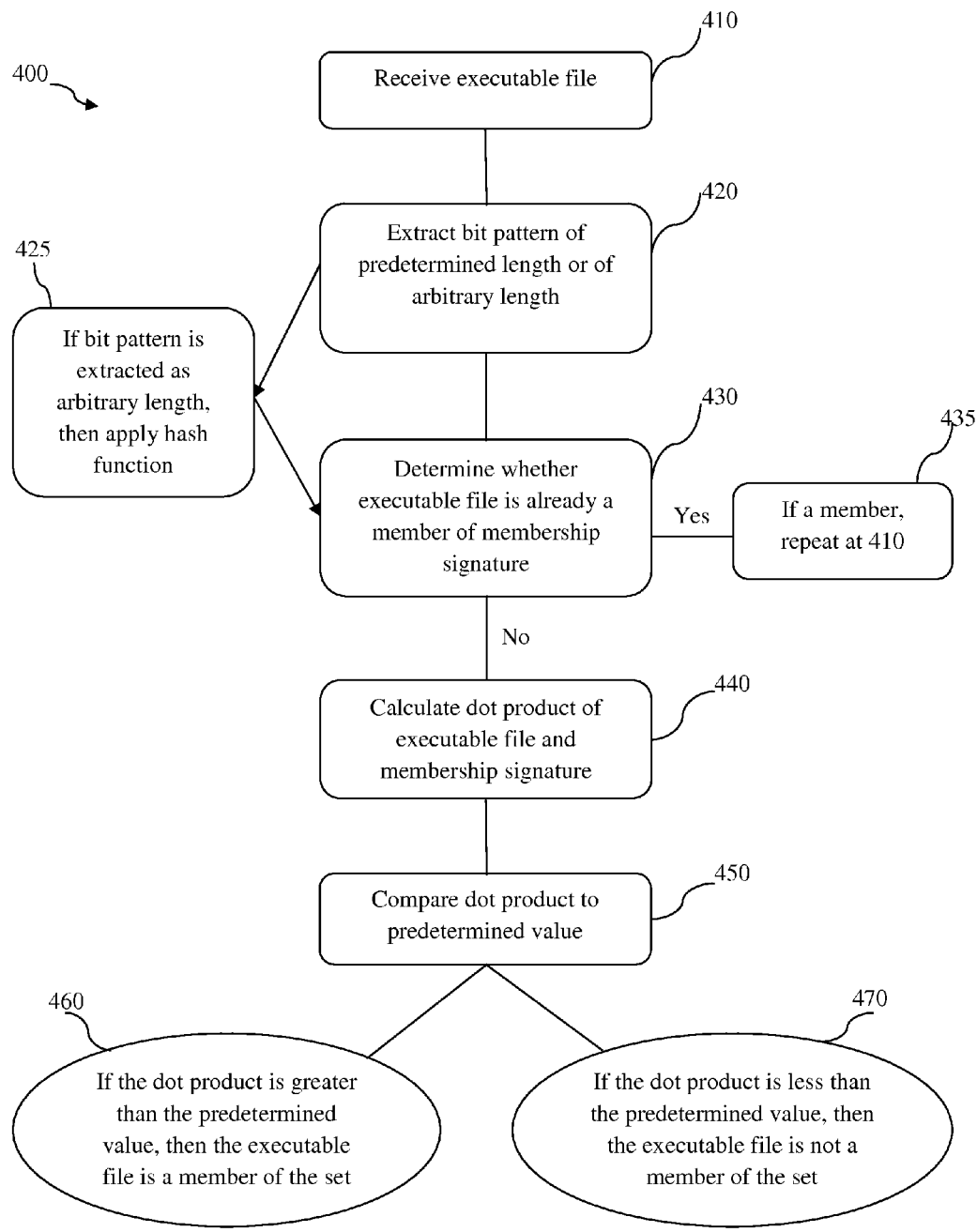
FIG. 4 is a flowchart of a method of testing according to one embodiment of the present invention.

Referring now to FIG. 4, a flow chart of the method of testing 400 according to one embodiment of the present invention is depicted. Initially, at 410, an executable file is received as an input to the membership query system. At 420, an executable file of predetermined length, is received. As described above with respect to FIG. 1, the executable file received may already be at a predetermined length and does not require the application of a hash function. As such, the process would continue at step 430 without the need to apply a hash function. In an alternate embodiment, at 425, the executable file is of an arbitrary length and is hashed to a bit pattern of a predetermined, fixed length. At 430, the method 400 determines whether the executable file is already a member of the membership signature. If the executable file is already a member of the membership signature, then at 435, the process repeats at step 410. If the executable file is not already a member of the membership signature, then at 440, the method 400 calculates the dot product of the executable file and the membership signature as determined in the learning mode of FIGS. 2 & 3. The dot product of step 440 is compared at 450 to a predetermined value to determine whether the executable file is a member of the membership signature. If the dot product of step 440 is less than the predetermined value in the comparison step 450, then the executable file is not a member of the membership set at 470. If the dot product of step 440 is greater than the predetermined value in the comparison step 450, then the hashed executable file is a member of the membership set at 460.

In another embodiment of the present invention, the membership query system may include a function to update the membership signature. As an example, the membership signature is a set of "known good" executable files. When an executable file is received as an input to the membership query system and a determination is made as in step 470 of FIG. 4 that the executable file is not a member of the membership set, the updating function determines, after an investigation, whether the executable file is "good" or "bad." The investigation is any method known to one of ordinary skill in the art to determine whether an executable file contains malware or not. If it is determined that the executable file is "good," then the membership signature is updated to include this executable file as a "known good."

Figure 5:
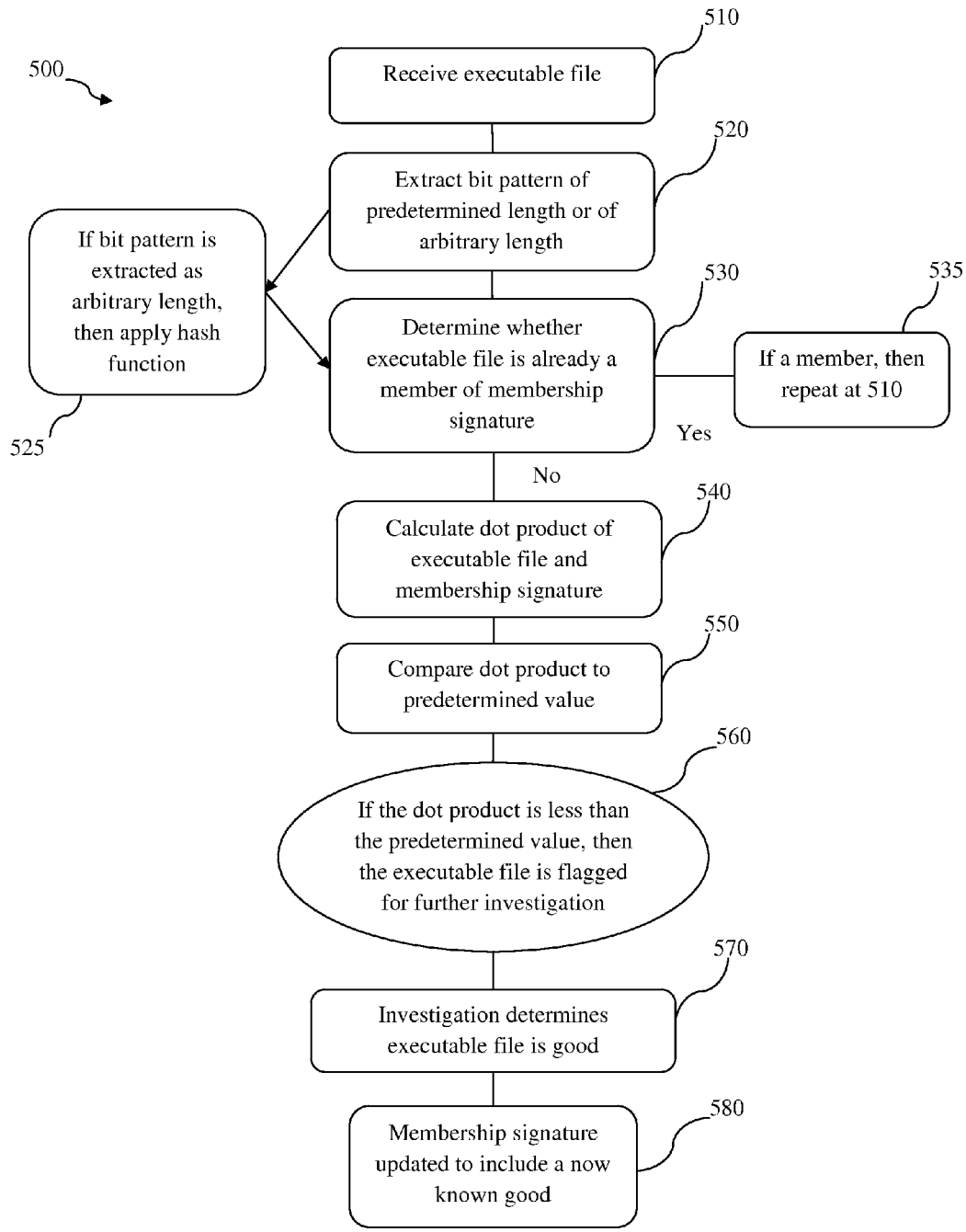
FIG. 5 is a flowchart of a method of updating the membership signature according to one embodiment of the present invention.

Referring now to FIG. 5, a flow chart of the method of updating 500 the membership signature according to one embodiment of the present invention is depicted. The membership signature is a set of "known goods." Initially, at 510, an executable file is received as an input to the membership query system. At 520, an executable file of predetermined length, is received. As described above with respect to FIG. 1, the executable file received may already be at a predetermined length and does not require the application of a hash function. As such, the process would continue at step 530 without the need to apply a hash function. In an alternative embodiment, at 525, the executable file is of an arbitrary length and is hashed to a bit pattern of a predetermined, fixed length. At 530, the method 500 determines whether the executable file is already a member of the membership signature. If the executable file is already a member of the membership signature, then at 535, the process repeats at step 510. If the executable file is not already a member of the membership signature, then at 540, the method 500 calculates the dot product of the executable file and the membership signature as determined in the learning mode of FIGS. 2 & 3. The dot product of step 540 is compared at 550 to a predetermined value to determine whether the executable file is a member of the membership set. If the dot product of step 540 is less than the predetermined value in the comparison step 550, then the executable file is not a member of the membership set at 560 and is flagged for further investigation at 570. At 570, the investigation determines whether the executable file is a "good" or a "bad." If at 570, it is determined the hashed executable file is "good," then the membership signature is updated at 580 to include this executable file as a now "known good."

Figure 6:
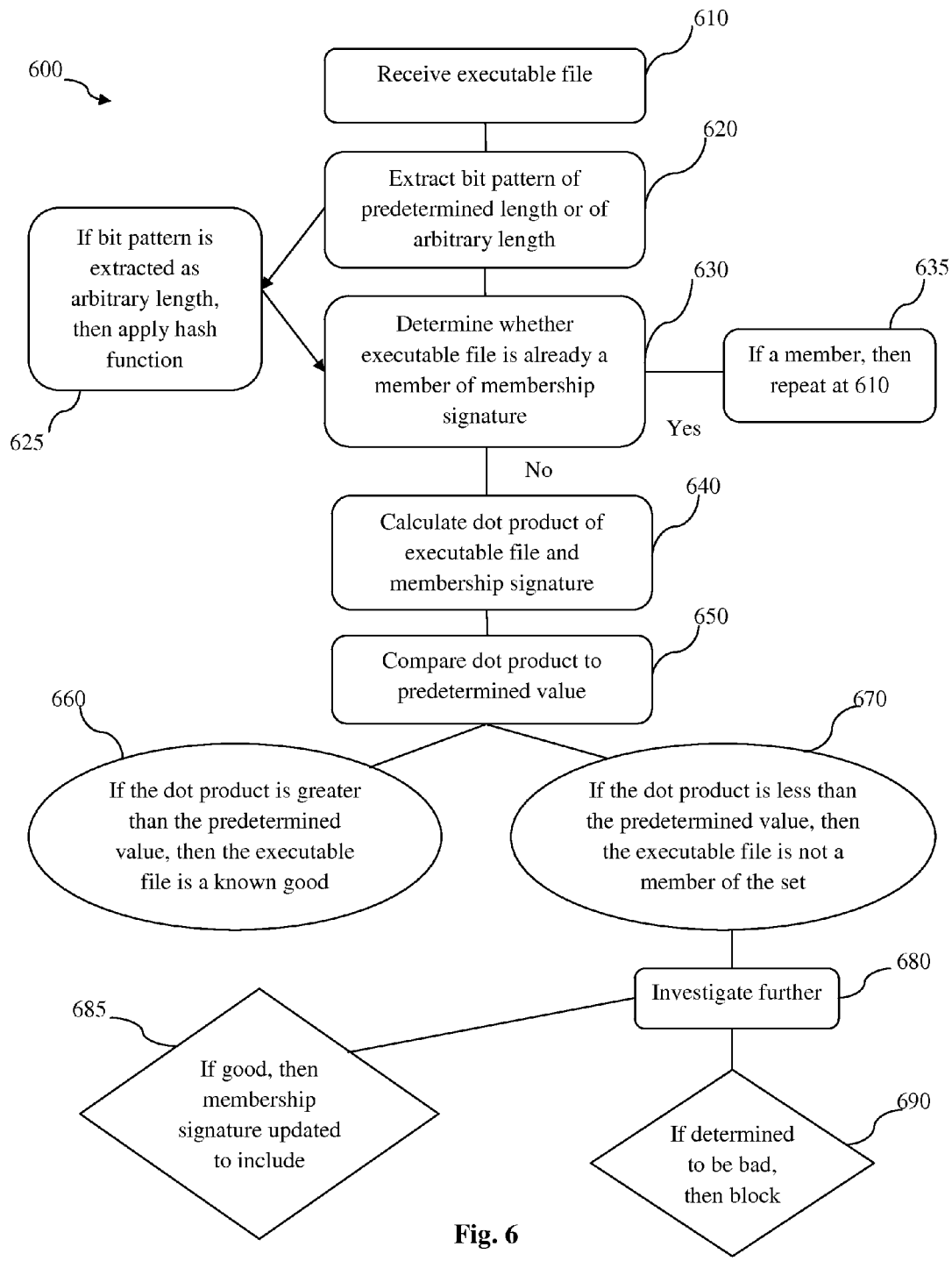
FIG. 6 is a flowchart depicting a method of detecting malware in a cybersecurity scenario according to one embodiment of the present invention.

FIG. 6 is a flow chart depicting a method of detecting malware in a cybersecurity scenario. The membership signature for the purposes of this figure description is a set of "known goods," i.e. not malware or computer viruses. Initially, at 610, an executable file is received as an input to the membership query system. At 620, an executable file of predetermined length, is extracted. The bit pattern may be, for example, 1,000 bits or 1,000,000 bits. With respect to the use case described herein, the extracted bit pattern is equal to or greater than 10,000 bits. As described above with respect to FIG. 1, the executable file extracted may already be at a predetermined length and does not require the application of a hash function. As such, the process would continue at step 630 without the need to apply a hash function. In an alternative embodiment, at 625, the executable file is of an arbitrary length and is hashed to a bit pattern of a predetermined, fixed length. The hash function may be a cryptographic hash function or a non-cryptographic hash function.

At 630, the method 600 determines whether the executable file is already a member of the membership signature. If the executable file is already a member of the membership signature, then at 635, the process repeats at step 610. If the executable file is not already a member of the membership signature, then at step 640, the method 600 calculates the dot product of the executable file and the membership signature as determined in the learning mode of FIGS. 2 & 3. The dot product of step 640 is compared at 650 to a predetermined value to determine whether the executable file is a member of the membership set. If the dot product of step 640 is less than the predetermined value in the comparison step 650, then the executable file is not a member of the membership set and is flagged for further investigation at 670. The investigation is any method known to one of ordinary skill in the art to determine whether an executable file contains malware or not. If at 660, it is determined the executable file is greater than the predetermined value in the comparison step 650, then the executable file is a member of the membership set of "known goods." At 680, the investigation determines whether the executable file is a "good" or a "bad." If at 680, the investigation determines the flagged executable file is "good," then the membership signature is updated at 685 to include this executable file as a now "known good." If at 680, the investigation determines the flagged executable file is "bad," then at 690 the "bad" flagged executable file or malware is blocked.

Although the membership query system has been described in the context of executable files, i.e. malware, one of ordinary skill in the art will appreciate that the method has applications across a broad range of scenarios where large databases need to be searched and computation power and memory capacity are a concern. As an example of an alternative embodiment where the membership query system has applicability, the following embodiment will be described in the context of biometrics.

Figure 7:
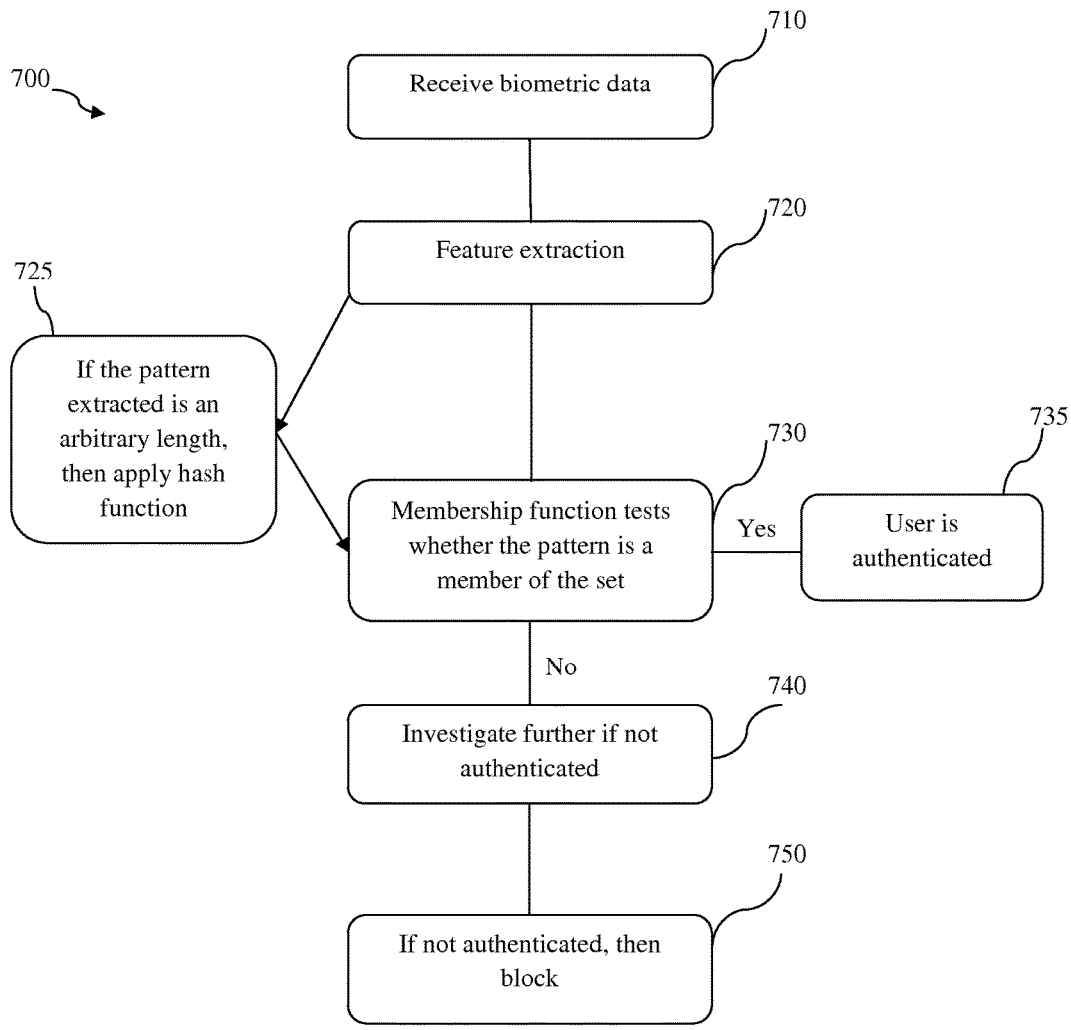
FIG. 7 is a flowchart of a membership query system applied to biometrics according to one embodiment of the present invention.

FIG. 7 is a flow chart of a membership query system 700 according to an embodiment of the present invention as applied in the context of biometrics. Biometrics is the authentication of an identity of a user based on an analysis of biological data such as the user's fingerprints, eye retinas and irises, voice patterns, facial patterns, and the like. The membership query system 700 is configured to receive biometric data 710. At step 720, the membership query system 700 is configured to perform feature extractions from the received biometric data 710. The feature extraction step 720 may include an analytical method or a statistical method to quantize the extracted biometric data.

The analytical method, as applied within the feature extraction step, quantizes the biometric data by extracting an exemplar for a range of continuous values. For example, if the range of values for a particular type of biometric data is between 0.4 and 0.6, then the exemplar may be set at 0.5. Performing the quantizing step of the biometric data ensures that similar values are mapped to the same feature value. The quantizing step, however, may not be applicable to all types of analytical data, for example, some types of biometrics, such as the number of ridges in a fingerprint.

The feature extraction step 720 may include biometric data already at a predetermined length and therefore does not require the application of a hash function. As such, the process would continue at step 730 without the need to apply a hash function. In an alternative embodiment, at 725, the extracted biometric data is of an arbitrary length and is hashed to a pattern of a predetermined, fixed length. The hash function may be a cryptographic hash function or non-cryptographic hash function. At step 730, the membership query system 700 includes a membership function that tests or queries whether the biometric data at step 720 or 725 is a member of a database of a certain data type. In this case, whether the user's biometric data is a member of a database of stored biometric data. If the biometric data at step 730 is a member of the database of stored biometric data, then the membership query system 700 may send an instruction 735 to authenticate or accept the user.

If the test at step 730 determines that the biometric data at step 720 or 725 is not a member of the database of stored biometric data, then the membership query system 700 flags the user at step 740 for further investigation or authentication through an alternative biometric device. If after further investigation or authentication through an alternative biometric device a determination is made that the flagged biometric data is not authenticated, then at step 750, the membership query system 700 may send an instruction to block the user of the now unauthenticated biometric data.

In an alternative embodiment, the statistical method of feature extraction may also quantize the biometric data by extracting an exemplar for a range of continuous values. The statistical method of feature extraction may be a multi-layer perceptron network or deep learning algorithm. Typically three hidden layers are used. The input layer and the output layer have the same dimensionality. The network is trained by feeding the input and an exemplar of the equivalence class comprising the input as the output. The middle hidden layer has an output dimensionality substantially smaller than the dimensionality of the input. Once trained the output of the middle hidden layer represents a feature vector. The first few stages therefore functions as a feature vector extractor. The last few stages maps the feature vector to the exemplar of the equivalence class.

Once the feature extraction is performed using a statistical method, the process follows the same steps as described in FIG. 7 above.

As described above, the principle of operation described in the use of signature is dependent on three basic arithmetical operations, component-wise addition, component-wise multiplication and vector distance. It should be noted that the more complex operations of vector addition and vector dot product are defined in terms of the three more primitive operations. Specifically, vector addition is defined in terms of component-wise addition and vector dot product is defined in terms of component-wise multiplication and vector distance. Adding vectors is performed by adding each corresponding vector component using component-wise addition. Mathematically, $x+y=(x_1-y_1, x_2+y_2, \ldots, x_n+y_n)$, where the $x_i$'s are the components to the vector x and the $y_i$'s are the components to the vector y and + component-wise addition. Also, $x \cdot y = d((x_1 \times y_1, x_2 \times y_2, \ldots, x_n \times y_n), 0)$, where x is component-wise multiplication, d is the distance function and 0 is the zero vector. Furthermore, bit sequences such as those extracted from executable binaries may also be encoded as in a fashion other than 1's and 0's as shown by the examples below.

The most straightforward and naïve approach is to apply standard real number operations. Component-wise addition is the addition of real numbers, component-wise multiplication is the multiplication of real numbers and vector distance is Euclidean distance. This approach is the most accurate but least space efficient as each component is represented by a real number. While it may be tempting to encode a bit stream by mapping 0's to the real number 0.0 and 1's to the real number 1.0, a more geometrically balanced mapping would map 0's to the real number −1.0 instead. As is known in the art, floating point is often 16 bits per number and "double precision" is 32 bits. With modern processors quad precision (64 bits) is also used.

In another embodiment, the arithmetic that can be imposed is the use of an algebraic field, such as $GF(2^n)$. Component-wise addition and component-wise multiplication are simply the standard arithmetic on $GF(2^n)$. However since elements in $GF(2^n)$ can represents n-bits. A bit pattern can be broken up into n-bits segments then encoded into $GF(2^n)$. Take the example of GF(8), elements in GF(8) can be represented as 3-bit numbers. To encode the following 12-bit sequence, 011101010100, would map into the following 4 component GF(8) vector, (011,101,010,100), where 011, 101, 010, 100 each represent elements of GF(8). In general a N-bit pattern would be encoded as a N/n component vector in $GF(2^n)$. As for the selected distance on $GF(2^n)$, using the Euclidean distance for small values of n will likely lose the quasi-orthogonality properties of the vector space. Instead for small values of n some sort of Hamming distance variation should be used. For example, the $GF(2^n)$ vectors are mapped back into a bit pattern by reversing the process described above and then the Hamming distance can be used.

Finally another possible arithmetic is to use arithmetic on $Z_2$. Pentti Kanerva introduced an arithmetic for his spatter codes for dealing with high dimensional bit operations. Addition on $Z_2$ was used as multiplication when treating in his spatter code arithmetic. For addition, a threshold sum is used. The sum operates on values and is calculated by taking the ordinary arithmetic sum as integers. If the sum is greater than half the number of operands then a "1" is the result and if the sum is less than half the number of operands then a "0" is the result. In the case of an even number of operands and the sum is equal to exactly half the number of operands, various tie breaking schemes can be employed. Kanerva suggests picking a random value. Alternatively a deterministic approach could be taken such as always picking "1" or basing the value on a secondary calculation.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A method of evaluating malicious cyber activity in a computer system, the method comprising the steps of:
   receiving, at a computer system, an executable file;
   extracting, at the computer system, a representative pattern of a predetermined length from the executable file;
   acquiring, at the computer system, a membership signature corresponding to a membership set of executable files associated with a predetermined cyber activity threat level; and
   determining, at the computer system, whether the executable file is a member of the membership set by applying a membership function comprising a dot product of the representative pattern and the membership signature and comparing the dot product of the representative pattern and the membership signature to a predetermined value.

2. The method of claim 1, wherein the extracted representative pattern is not of a predetermined length but is of an arbitrary length.

3. The method of claim 2, wherein a representative pattern of a predetermined length is acquired by applying a hash function to the extracted representative pattern of arbitrary length.

4. The method of claim 3, wherein the hash function is cryptographic or non-cryptographic hash function.

5. The method of claim 1, further comprising a learning mode to define the membership signature, comprising the steps of:
   setting, at the computer system, a membership signature to a predetermined initial value;
   receiving, at the computer system, an initial executable file;
   extracting, at the computer system, a representative pattern of a predetermined length from the initial executable file; and
   defining, at the computer system, the membership signature by adding the representative pattern of a predetermined length from the initial executable file to the predetermined initial value of the membership signature.

6. The method of claim 5, further comprising the step of:
   determining, at the computer system, whether the extracted representative pattern of a predetermined length from the initial executable file is already a member of the membership signature.

7. The method of claim 6, wherein the extracted representative pattern is not of a predetermined length but is of an arbitrary length.

8. The method of claim 7, wherein a representative pattern of a predetermined length from the initial executable file is acquired by applying a hash function to the extracted representative pattern of arbitrary length.

9. The method of claim 1, wherein the predetermined cyber activity threat level is zero or no threat.

10. The method of claim 1, wherein the representative pattern is a member of a membership set when the dot product of the representative pattern and the membership signature is greater than the predetermined value.

11. The method of claim 1, wherein the representative pattern is not a member of a membership set when the dot product of the representative pattern and the membership signature is less than the predetermined value.

12. The method of claim 11, further comprising a step to update the membership signature, comprising the steps of:
   determining, at the computer system, whether the representative pattern that is not a member of the membership set qualifies for inclusion in the membership set; and
   updating, at the computer system, the membership set to include the representative pattern that is not a member of the membership set if it is determined the representative pattern that is not a member of the membership set qualifies for inclusion.

13. The method of claim 12, wherein the dot product is a vector dot product and wherein the vector dot product is comprised of the operations of component-wise multiplication and vector distance.

14. At least one non-transitory computer readable medium including computer-executable instructions readable by a processor for configuring the processor to:
   receive an executable file;
   extract a representative pattern of a predetermined length from the executable file;
   acquire a membership signature corresponding to a membership set of executable files associated with a predetermined cyber activity threat level; and
   determine whether the executable file is a member of the membership set by applying a membership function comprising a dot product of the representative pattern and the membership signature and comparing the dot product of the representative pattern and the membership signature to a predetermined value.

15. The at least one non-transitory computer readable medium of claim 14, further comprising a learning mode to define the membership signature, comprising instructions for configuring the processor to:
   set a membership signature to a predetermined initial value;
   receive an initial executable file;
   extract a representative pattern of a predetermined length from the initial executable file; and
   define the membership signature by adding the representative pattern of a predetermined length from the initial executable file to the predetermined initial value of the membership signature.

16. The at least one non-transitory computer readable medium of claim 15, further comprising instructions for configuring the processor to:
   determine whether the extracted representative pattern of a predetermined length from the initial executable file is already a member of the membership signature.

17. The at least one non-transitory computer readable medium of claim 14, wherein the predetermined cyber activity threat level is zero or no threat.

18. The at least one non-transitory computer readable medium of claim 17, further comprising a step to update the membership signature, comprising instructions for configuring the processor to:
   determine whether the representative pattern that is not a member of the membership set qualifies for inclusion in the membership set; and
   update the membership set to include the representative pattern that is not a member of the membership set if it is determined the representative pattern that is not a member of the membership set qualifies for inclusion.

* * * * *